(12) United States Patent
Priddle et al.

(10) Patent No.: US 8,923,651 B2
(45) Date of Patent: Dec. 30, 2014

(54) DATA SYSTEM AND METHOD

(75) Inventors: Clinton Priddle, Upplands Väsby (SE); Stefan Ålund, Enskede (SE); Per-Erik Brodin, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 943 days.

(21) Appl. No.: 12/665,724

(22) PCT Filed: Jun. 27, 2008

(86) PCT No.: PCT/IB2008/003021
§ 371 (c)(1),
(2), (4) Date: Dec. 20, 2009

(87) PCT Pub. No.: WO2009/001226
PCT Pub. Date: Dec. 31, 2008

(65) Prior Publication Data
US 2010/0172594 A1 Jul. 8, 2010

Related U.S. Application Data

(60) Provisional application No. 60/929,465, filed on Jun. 28, 2007.

(51) Int. Cl.
*G06K 9/36* (2006.01)
*G06T 11/60* (2006.01)
*G06T 11/00* (2006.01)

(52) U.S. Cl.
CPC ............... *G06T 11/60* (2013.01); *G06T 11/00* (2013.01)
USPC ........................................................ 382/291

(58) Field of Classification Search
USPC ................................................. 382/291, 197
See application file for complete search history.

(56) References Cited

U.S. PATENT DOCUMENTS

| 4,841,292 A | * | 6/1989 | Zeno ............................. 345/419 |
| 6,233,518 B1 | * | 5/2001 | Lee ............................... 701/117 |
| 6,370,526 B1 | * | 4/2002 | Agrawal et al. ....................... 1/1 |

(Continued)

FOREIGN PATENT DOCUMENTS

| JP | 2004-164208 A | 6/2004 |
| JP | 2005-310422 A | 11/2005 |
| JP | 2007-072601 A | 3/2007 |
| WO | 2006/040925 | 4/2006 |

OTHER PUBLICATIONS

EPO, Int'l Search Report in PCT/IB2008/003021, Mar. 13, 2009.

(Continued)

*Primary Examiner* — Jingge Wu
(74) *Attorney, Agent, or Firm* — Patent Portfolio Builders PLLC

(57) ABSTRACT

Vector-based images and documents, such as those written in SVG and Adobe Flash, can be converted into equivalent bitmap or other non-vector-based image by parsing the vector-based image to detect objects in the vector-based code. For each detected object, a separate bitmap of the object is created and information about where that image lies on the z-axis is retained. A separate bitmap image is created for each object, and the separate bitmap images are layered on top of one another, which is to say ordered along the z-axis in accordance with their z-axis coordinates. Animation of an image can be implemented by selectively rendering different ones of the bitmap images as transparent.

15 Claims, 3 Drawing Sheets

(56) References Cited

U.S. PATENT DOCUMENTS

| | | | |
|---|---|---|---|
| 6,741,242 B1* | 5/2004 | Itoh et al. | 345/419 |
| 8,194,933 B2* | 6/2012 | Lei et al. | 382/112 |
| 2003/0098881 A1* | 5/2003 | Nolte et al. | 345/764 |
| 2003/0222883 A1 | 12/2003 | Deniau et al. | |
| 2004/0233163 A1* | 11/2004 | Lapstun et al. | 345/156 |
| 2005/0012946 A1* | 1/2005 | Wilson | 358/1.9 |
| 2005/0108001 A1* | 5/2005 | Aarskog | 704/10 |
| 2005/0140678 A1* | 6/2005 | Gielis et al. | 345/441 |
| 2006/0072134 A1* | 4/2006 | Umezawa et al. | 358/1.9 |
| 2006/0140513 A1* | 6/2006 | Tran Xuan et al. | 382/305 |
| 2006/0262134 A1* | 11/2006 | Hamiter et al. | 345/619 |
| 2006/0279758 A1* | 12/2006 | Myoki | 358/1.13 |
| 2006/0288278 A1* | 12/2006 | Kobayashi | 715/523 |
| 2007/0016602 A1* | 1/2007 | McCool et al. | 707/102 |
| 2007/0046694 A1* | 3/2007 | Aizikowitz et al. | 345/619 |
| 2008/0056538 A1* | 3/2008 | Frank | 382/113 |

OTHER PUBLICATIONS

EPO, Int'l Prelim Report on Patentability in PCT/IB2008/003021, Dec. 4, 2009.

J.D. Murray et al., Encyclopedia of Graphics File Formats 2d ed., 1996, chapts. 3, 4, 7, O'Reilly & Assocs.

L. Rein, The Next Big Picture Scalable Vector Graphics for the Web, Sep. 1998, pp. 59-64, Web Techniques, vol. 3, No. 9, Miller Freeman USA.

S.J. Vaughan-Nichols, Will Vector Graphics Finally Make It on the Web, Dec. 2001, pp. 22-24, IEEE Computer Society, vol. 34, No. 12.

A, Di Iorio et al., Dynamic Conversion between XML-Based Languages for Vector Graphics, Jan. 18, 2006 pp. 6061N-1 to 6061N-9, Internet Imaging VII, SPIE vol. 6061N.

Japan Patent Office, Action in JP2010-514192, Oct. 9, 2012.

* cited by examiner

DATA SYSTEM AND METHOD

BACKGROUND

This invention relates to image rendering with computers and software and more particularly to devices and software components for translating vector graphic documents into bitmapped documents.

Scalable Vector Graphics (SVG) is a computer-readable language that is based on eXtensible Markup Language (XML) and is used for representing static and dynamic vector graphic images. SVG is able to define two-dimensional images using tags conforming to XML that determine the images' attributes (e.g., size, shape, color, etc.). SVG is able to display not only the shapes of two-dimensional vector graphic images but also bitmapped graphics and text. SVG is vector-based, which means content is not written for specific screen resolutions and sizes but can easily be scaled. SVG is standardized by the World Wide Web Consortium (W3C), which has adopted SVG version 1.1 as a W3C Recommendation.

HyperText Markup Language (HTML) is another computer-readable language that is written using tags and at least in that respect is similar to XML. XHTML is a version of HTML that is conformant to XML. From the beginning, HTML was intended to represent the logical structure of text, not graphics, in content such as documents and web pages. Images are represented in HTML as bitmaps. The physical representation of headings, paragraphs, etc. is determined by the browser that renders the HTML code. As time passed, more control over the visual appearance of web pages became desirable with HTML. Tags, such as the font tag, were introduced that enabled web and other content developers to specify the typeface, size, weight, and color of text in HTML pages. Using table elements with zero-width borders, it became possible to do advanced layout and positioning of page contents, but the HTML code became cluttered and hard to comprehend. Today, HTML is again written to represent the structure of documents, leaving presentation-related formatting to Cascading Style Sheets (CSS), which is a mechanism for adding styles (e.g., fonts, colors, spacing, etc.) to web pages and documents.

In recent years, web applications have emerged, which are web pages that try to mimic the behavior of regular software applications. For example, modern browsers support JavaScript, which is another computer-readable language, and HTML documents are accessible through the Document Object Model, which is a W3C-standard, object-oriented Application Program Interface (API) for accessing content elements, such as images on a web page, as objects. JavaScript is one of many types of scripting logic that can be inserted or embedded in a web application (or web content or web page) and executed by a processor in displaying a web page.

The Third Generation Partnership Project (3GPP), which promulgates specifications for many electronic communication systems, adopted SVG 1.1 for the 3GPP Release 5 specifications, and SVG is today used by roughly 100 million mobile telephone handsets and other user equipments (UEs) for generating and displaying images. For example, UEs now routinely access the World Wide Web with browser applications that adjust images and other downloaded content for the commonly smaller screens included in those equipments.

Specification of SVG Tiny 1.2 is under development by W3C for SVG version 1.2. SVG Tiny is specifically designed for mobile devices, which typically have limited memory and processing resources. SVG Tiny 1.2 has also been adopted by 3GPP for the Release 6 specifications. Support for a variety of new multimedia features, including full control of audio and video, is included along with micro DOM ($\mu$DOM) and scripting. $\mu$DOM is a subset of the Document Object Model (DOM). Some SVG attributes can be manipulated by $\mu$DOM scripts, enabling many kinds of animation. Objects can be added or removed to create dynamic content on the page.

Among other things, SVG and other vector-based representations facilitate animation because information about background objects currently hidden from view by foreground objects is not lost. Consequently, when a foreground object is made to appear in a different location in a different image, it is possible to include the formerly hidden background object(s) in that different-location image. In particular, SVG uses a "painters model" of rendering, in which "paint" is applied in successive operations. In other words, an electronic processor renders an object on an output device or display by carrying out a succession of "paint" operations. With each operation, the processor paints over a corresponding area of the output display, and when an area being painted overlaps a previously painted area, the new paint partially or completely obscures the old paint.

Because images defined in HTML are bitmaps, information about the appearance of a background object hidden by a foreground object does not exist. This lack of information makes it difficult for a processor to render formerly-background objects when foreground objects are made to appear in different locations.

It is straightforward to convert an SVG or equivalent vector-based image to a bitmap image, but doing so has a number of drawbacks. For example, it is very difficult (even impossible) to change an image, e.g., to show motion, once it has been converted from SVG, for example, to a bitmap image. As noted above, information about the appearance of background objects hidden by foreground objects that was present in the SVG or other vector-based representation does not exist in the HTML or other non-vector-based representation. Moreover, advanced applications in SVG are not executable by many UEs because SVG Tiny 1.2 is not yet fully deployed and SVG is not be supported on every type of UE.

It is desirable to be able to be able to convert SVG and equivalent vector-based images into bitmaps and equivalent non-vector-based images because this would enable the display of SVG-originated and other vector-graphic content on more types of UEs and other display devices.

SUMMARY

An SVG image (application or document) can be split into a number of principle components that are converted to bitmap images and positioned in a corresponding HTML page. In this way, the dynamics of the SVG document can be preserved. The HTML page can be constructed in a way such that the functionality in common with the SVG page, e.g., DOM, is done in the same way. For example, ID attributes from components in an SVG document can be the same as translated components in a corresponding HTML document. The invention is also applicable to formats other than SVG and HTML, and can be implemented in both directions, e.g., SVG-to-HTML and HTML-to-SVG.

In accordance with aspects of this invention, there is provided a method of translating at least one image object in a document written in a vector-based computer-readable language into a corresponding image object in a document written in a bitmap-based computer-readable language. The method includes detecting at least one object identifier associated with at least one respective object in the vector-based document; and generating a bitmap of the at least one object corresponding to the detected at least one object identifier. The generated bitmap retains from the vector-based document information about a position of the bitmap along an axis perpendicular to a plane of the document.

In accordance with other aspects of this invention, there is provided a programmable electronic processor that includes a processing unit configured to execute instructions such that the processor translates at least one image object in a document written in a vector-based processor-readable language into a corresponding image object in a document written in a bitmap-based processor-readable language; and an application memory configured to store instructions executed by the processing unit. The processing unit is configured to perform the following actions: detecting at least one object identifier associated with at least one respective object in the vector-based document; and generating a bitmap of the at least one object corresponding to the detected at least one object identifier. The generated bitmap retains from the vector-based document information about a position of the bitmap along an axis perpendicular to a plane of the document.

In accordance with further aspects of this invention, there is provided a computer-readable medium having stored instructions that, when executed, cause the computer to carry out a method of translating at least one image object in a document written in a vector-based computer-readable language into a corresponding image object in a document written in a bitmap-based computer-readable language.

BRIEF DESCRIPTION OF THE DRAWINGS

The various features, objects, and advantages of this invention will be apparent after reading this description together with the drawings, in which.

DETAILED DESCRIPTION

The inventors have recognized that an SVG or other vector-based image, such as Adobe Flash, can be converted into an equivalent bitmap (for HTML documents) or other non-vector-based image by parsing a rendered SVG image to detect objects in the original SVG code. For each detected object, a separate bitmap of the object is created and information about where that image lies along the z-axis, i.e., which paint layer, is retained. A separate bitmap image is created for each object, and the separate bitmap images are then layered on top of one another, which is to say ordered along the z-axis in accordance with their z-axis coordinates. Animation of an image can be implemented by selectively rendering different ones of the bitmap images as transparent or invisible.

The artisan will appreciate a distinction between transparency and visibility. Transparency in bitmap images enables representation of objects that do not have square or rectangular shapes. For example, the sun can be drawn as a circle with "rays" that let the sky (i.e., the background, represented by another bitmap image) be "seen" between the rays. Using transparency, a "complete" image can be built by stacking several bitmap images on top of each other. Visibility means a bitmap is rendered visible or hidden. Such a visibility property can be used to alter the properties of an object as it appears on the screen, e.g., to hide a blue circle thereby making a red circle visible at the same position on a display.

An SVG document is labeled in a way that makes it possible to identify objects. For example, each object in an image or document has a corresponding object identifier, such as an object name, and identifiers can be considered as residing in an abstraction layer created from the vector format. Identifiers are commonly used to locate objects in the DOM tree, and so any SVG document created to be scriptable, which is to say implementable by scripting logic, usually has suitable identifier(s). SVG documents are typically created with a suitable drawing tool, such as Inkscape, which is a vector graphics editor that uses the SVG file format. Information about Inkscape is available on the Internet at www.inkscape.org.

In general, an object is a distinct part of the SVG or other vector graphic document that is to be represented as an object in HTML. An object can be a single image element or several elements grouped together, with the group having a specific label. Thus, one possibility is that all SVG elements are objects, but it is also possible to group objects, which may be done by a suitable drawing tool. Such grouping is suggestive of the "group" function for non-SVG drawing objects in applications like Microsoft PowerPoint and Word. An object name is conveniently represented in the computer-readable code for the object by an identification (ID) attribute. SVG, as noted above, as well as HTML, and equivalent languages provide for ID attributes.

Figure 1A:
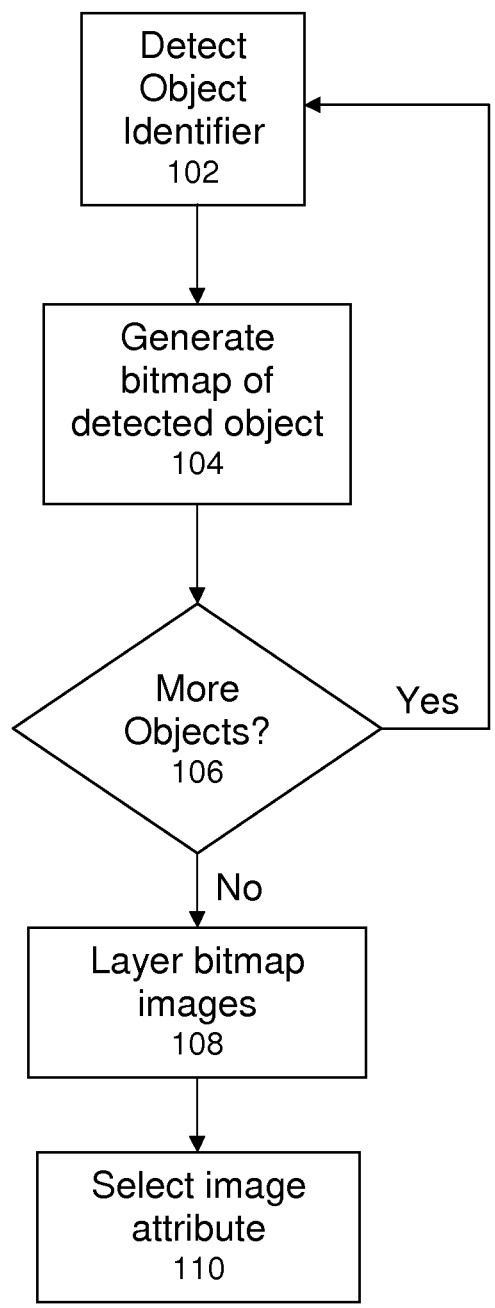
FIG. 1A is a flow chart of a method of translating documents and images in vector-based format to documents and images in bitmapped format.

Thus, a method of translating a document or image written in vector-based code to a document or image written in bitmap code can include the following steps, which are illustrated by the flow chart in FIG. 1A. In step 102, an object identifier associated with an object, in particular an image object, in an SVG or other vector graphic document is detected, for example by scanning the document SVG code for object identifiers. Either a computer can be suitably programmed to carry out such object detection, or a script developer can review documents to pinpoint "interesting" identifiers in order to not create more bitmap images than necessary. Detecting an object can include grouping individual image elements and determining whether the behavior of the grouped elements (e.g., movement or animation of the elements) changes for different groupings. It is generally possible to create bitmap images of all principle parts of an SVG document, but doing so is not always practical.

On detecting an object identifier, a non-vector-graphic version of the corresponding object, such as a bitmap, is generated that retains from the vector-graphic code information about where the corresponding image lies in the z-plane (step 104). A suitable bitmap can be generated by determining the bounding box of the object, and then rasterizing that particular region into a bitmap. A bounding box is typically the tightest-fitting rectangle aligned with the axes of the object's coordinate system that entirely encloses the object and its descendants. When an object is rasterized, all other objects are made invisible so that they will not appear in that bitmap. The artisan will understand that by rendering an SVG document in the memory of a suitable processor, the bounding box of every object in the document will be known, and rasterization is well known to involve simply taking the rendered contents of a bounding box.

If there are further detected objects (Yes in step 106), non-vector-graphic versions of those objects are generated by repeating steps 102 and 104. If there are no more detected objects (No in step 106), the one or more separate bitmap images corresponding to the one or more objects detected in the SVG code are layered on top of one another based on their respective z-plane coordinates in an HTML translation of the original SVG document (step 108).

The bitmaps are positioned in the HTML document at the same places as in the SVG document, preferably using absolute positioning. The order in which the objects appear are the same for both documents, so the order in which the objects appear on the z-axis, which is to say, the direction perpendicular to the viewing plane of the document, will be the same. Alternatively, the HTML code for the document can be written such that the positions of objects on the z-axis are set explicitly.

As an optional additional step 110, a transparency attribute of one or more of the bitmap-based images is selected such that the images are transparent. Thus, translated images can be readily animated, despite their having non-vector-graphic formats. The artisan will understand that the order of the steps 102-106 can be varied, for example, to use efficiently the components of a programmable electronic processor.

SVG and other vector-based documents support embedded images, and so the reverse method of translating from a non-vector-based format such as HTML to a vector-based format such as SVG is straightforward, although the vector representations of the objects are not available as they are not included in the non-vector-based original.

Figure 1B:
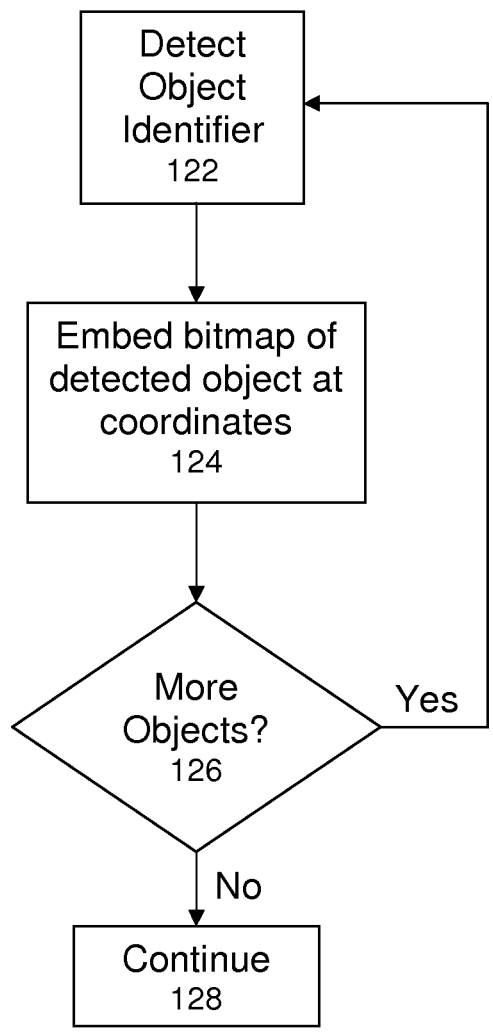
FIG. 1B is a flow chart of a method of translating from a non-vector-based format such as HTML to a vector-based format such as SVG.

FIG. 1B is a flowchart of an exemplary reverse method, in which in step 122, One or more object identifiers associated with a bitmap image in an HTML are detected, for example by scanning the HTML code for object identifiers. In step 124, the detected bitmap image is embedded at its respective coordinates in an SVG document. If there are further detected objects (Yes in step 126), the bitmaps of those objects are embedded in the SVG document by repeating steps 122 and 124. If there are no more detected objects (No in step 126), translation of the document is complete and the process flow continues with other tasks (step 128).

Figure 2:
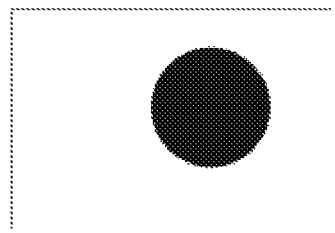
FIG. 2 depicts a rendering of an image that can be translated.

FIG. 2 is a rendering of an image object that contains a solid blue-colored circle covered by a square. (Due to the limitations of patent application formatting, the circle in FIG. 2 is not obscured for clarity and is black.) The image object depicted in FIG. 2 can be written in SVG as follows:

```
<svg>
    <circle cx="100" cy="50" r="30" style="fill: blue"/>
</svg>
``` and in that SVG code, cx, cy, and r will be recognized as SVG attributes that are animatable but not inheritable, which is to say that the attributes cx, cy (the coordinates of the center of the circle) and r (the circle's radius) can be scripted, but those attributes can not be carried over directly to an HTML document. To change the radius or another property, such as the color, of the circle, two (or more) circles are created with one circle visible and one (or more) hidden at a time.

The artisan will understand that there is no explicit z-axis coordinate in SVG, but the order of the elements in the document determines the elements' z-axis positions. This is also the case with HTML if the z-coordinate is not specified. If one chooses to put the elements in the HTML document in any other order, one can keep track of the z-positions in the SVG document, e.g., by storing them in a suitable memory, and then set the z-coordinates in the HTML document accordingly.

The image object depicted in FIG. 2 can be written in HTML as follows:

```
<html>
    <div style="position: absolute; left: 70px; top: 20px;">
        <img src="bluecircle.png">
    </div>
</html>
```

With a single DOM command in a language like SVG, the covering square in FIG. 2 can be deleted and the circle made visible. If the image of FIG. 2 were converted to a typical bitmap, for example by rasterizing as described above, the circle would no longer be present as a separate object in the image. In other words, the typical bitmap has only a single layer.

As described above, an SVG image (document) is transformed into a number of smaller images. This may be done using one image for each SVG object, or SVG objects may be grouped. The transformation and other steps described above can be readily implemented by one or more scripts, which preferably are common for SVG and HTML, i.e., only references to positions, names, etc. are used in the scripts.

Using this invention, the same (or very similar) look and functionality can be achieved in more than one version of the same client. The invention takes advantage of common APIs that the different versions have, for example the DOM API. This enables the use of common scripts. The combination of scripting and the HTML DOM may be called "Dynamic HTML", which can be used for animation, interactivity, and presentational effects.

Figure 3:
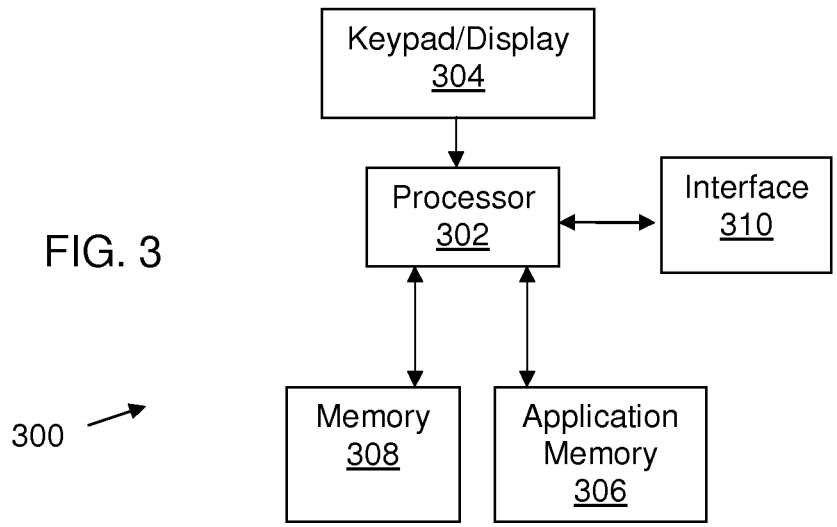
FIG. 3 is a block diagram of an electronic processor for translating documents and images in vector-based format to documents and images in bitmapped format.

Such conversion methods can be advantageously carried out by many programmable electronic processors. FIG. 3 is a block diagram of a suitable processor 300 that can implement the methods described above. The processor 300 includes a processing unit 302, which may include one or more sub-processors, and which executes one or more software modules and applications to carry out the methods described in this application. User input to the processor 300 is provided through a keyboard or other device, and information may be presented to the user on a display 304. The keyboard/display 304 is considered optional, and is thus indicated by dashed lines, because some the methods described above can be implemented in ways that do not require user interaction. Software instructions implementing the methods can be stored in a suitable application memory 306, and the processor may also download and/or cache desired information in a suitable memory 308. The processor 300 also may include an interface 310 that can be used to connect other components, such as other processors, communication devices, etc., to the processor 300.

Figure 4:
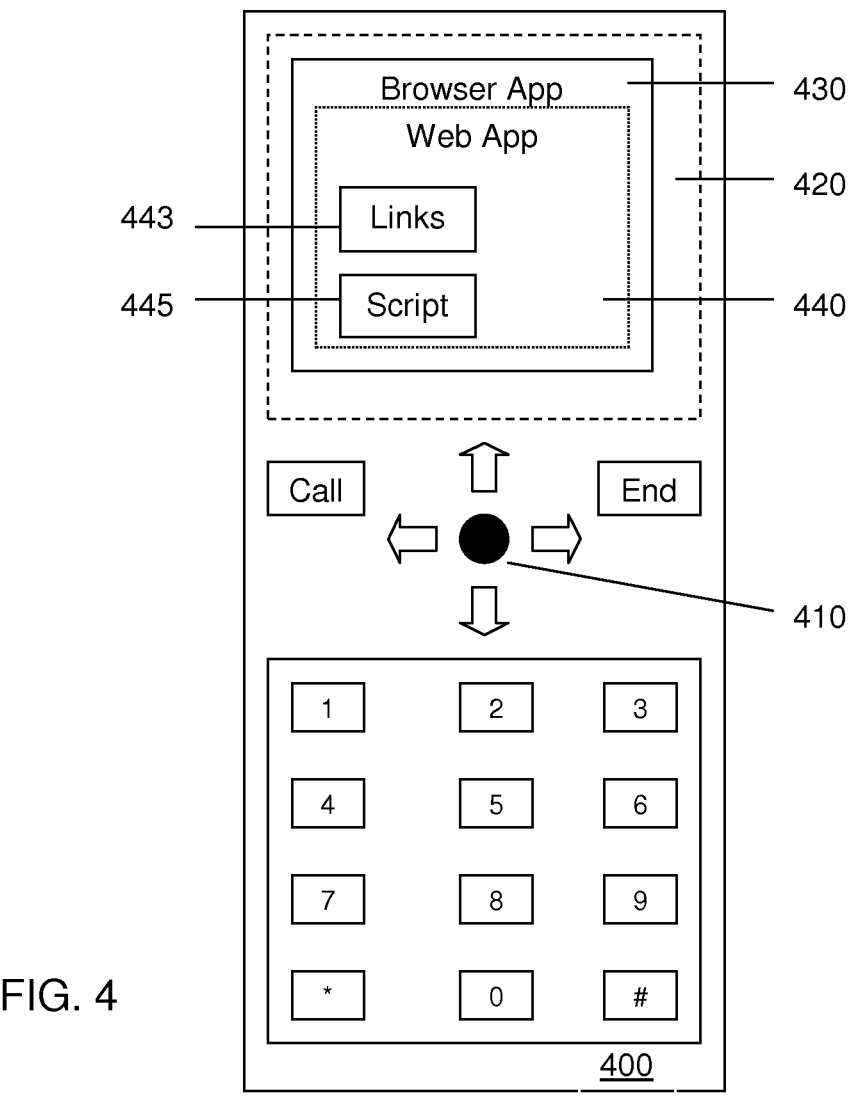
FIG. 4 depicts an exemplary mobile communication device.

FIG. 4 depicts a UE 400, such as a mobile telephone, that can include the processor 300. The UE 400 may include a joystick or other navigation device 410 and a display 420. A web browser application 430 can be executed by the processor 300 (not shown in FIG. 4) in the user equipment 400. A web application 440 may be downloaded and run within the browser 430. The web application may include a set of links 443 that can be invisible to a user or viewable the application on the display 420. The web application 440 can also include scripting logic 445 for carrying out the methods described in this application.

The artisan will understand that this application focusses on SVG and HTML, which are both mark-up languages with SVG having more degrees of freedom than HTML, simply for convenience and not for limitation. Prior techniques for converting documents between mark-up languages typically involve translating the mark-up (the code). An example of such a prior technique is Extensible Stylesheet Language Transformations (XSLT), which is a W3C XML-based language that can be used for transforming an XML document into another XML or other document. In contrast, techniques in accordance with this application involve retaining significant scriptable/animatable properties of what is on (or would be on) a display. This can involve grouping SVG elements such that the elements are converted to one bitmap image or equivalently that an object (as the object appears on screen) is built from stacked (grouped) layers of (transparent) bitmaps, depending on the desired method of scripting/animating the converted (HTML) document.

It will be appreciated that procedures described above are carried out repetitively as necessary, for example, to respond to time-varying and otherwise changing documents. The translation methods can be performed off-line, but they can also be performed in real time, e.g., in a mobile phone or other UE in response to a user's clicking on a web browser link. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method, comprising:
   translating a plurality of image objects in a document written in a vector-based computer-readable language into a corresponding plurality of image objects in a document written in a bitmap-based computer-readable language, the translating including:
   detecting a plurality of object identifiers associated with a like plurality of respective objects in the vector-based document;
   generating respective bitmaps of the plurality of objects corresponding to the detected plurality of object identifiers, wherein information about a position of each object along an axis perpendicular to a plane of the document is retained as coordinates, and the information includes an order of objects in the vector-based document that determines the objects' positions along the axis; and
   layering the respective bitmaps atop one another based on the order of objects in the vector-based document as derived from the retained coordinates, and a transparency attribute of one or more of the respective bitmaps.

2. The method of claim 1, wherein generating one or more of the respective bitmaps comprises determining a bounding box of one or more of the plurality of objects, and rasterizing a region of the document determined by the bounding box.

3. The method of claim 1, further comprising selecting the transparency attribute of the one or more respective bitmaps.

4. The method of claim 1, wherein one or more of the respective bitmaps is positioned in the document written in the bitmap-based language by absolute positioning.

5. The method of claim 1, further comprising explicitly setting a position of one or more of the respective bitmaps along the axis.

6. A programmable electronic processor, comprising:
   a processing unit configured to execute instructions such that the processor translates a plurality of image objects in a document written in a vector-based processor-readable language into a corresponding plurality of image objects in a document written in a bitmap-based processor-readable language; and
   an application memory configured to store instructions executed by the processing unit;
   wherein the processing unit is configured to perform the following actions:
   detecting a plurality of object identifiers associated with a like plurality of respective objects in the vector-based document;
   generating respective bitmaps of the plurality of objects corresponding to the detected plurality of object identifiers, wherein information about a position of each object along an axis perpendicular to a plane of the document is retained as coordinates, and the information includes an order of objects in the vector-based document that determines the objects' positions along the axis; and
   layering the plurality of respective bitmaps atop one another based on the order of objects in the vector-based document, and a transparency attribute of one or more of the respective bitmaps.

7. The programmable electronic processor of claim 6, wherein the processing unit is configured to generate one or more of the respective bitmaps by at least determining a bounding box of one or more of the plurality of objects, and rasterizing a region of the document determined by the bounding box.

8. The programmable processor of claim 6, wherein the processing unit is further configured to select the transparency attribute of the one or more respective bitmaps.

9. The programmable processor of claim 6, wherein the processing unit is configured to position the one or more bitmaps in the document written in the bitmap-based language by absolute positioning.

10. The programmable processor of claim 6, wherein the processing unit is configured to set a predetermined position of one or more of the respective bitmaps along the axis.

11. A non-transitory computer-readable medium having stored instructions that, when executed, cause the computer to carry out a method, comprising:
   translating a plurality of image objects in a document written in a vector-based computer-readable language into a corresponding plurality of image objects in a document written in a bitmap-based computer-readable language, the translating including:
      detecting a plurality of object identifiers associated with a like plurality of respective objects in the vector-based document;
      generating respective bitmaps of the plurality of objects corresponding to the detected plurality of object identifiers, wherein information about a position of each object along an axis perpendicular to a plane of the document is retained as coordinates, and the information includes an order of objects in the vector-based document that determines the objects' positions along the axis; and
   layering the plurality of respective bitmaps atop one another based on the order of objects in the vector-based document, and a transparency attribute of one or more of the respective bitmaps.

12. The non-transitory computer-readable medium of claim 11, wherein generating one or more of the respective bitmaps comprises determining a bounding box of one or more of the plurality of objects, and rasterizing a region of the document determined by the bounding box.

13. The non-transitory computer-readable medium of claim 11, wherein the method further comprises selecting the transparency attribute of the one or more respective bitmaps.

14. The non-transitory computer-readable medium of claim 11, wherein one or more of the respective bitmaps is positioned in the document written in the bitmap-based language by absolute positioning.

15. The non-transitory computer-readable medium of claim 11, wherein the method further comprises explicitly setting a position of one or more of the respective bitmaps along the axis.

* * * * *